United States Patent [19]
Kirby et al.

[11] 3,928,317
[45] Dec. 23, 1975

[54] ANTIBIOTIC BM408α

[75] Inventors: Jane Parsons Kirby, New City; Donald Bruce Borders, Suffern; Jean Hayes Korshalla, Pearl River, all of N.Y.

[73] Assignee: American Cyanamid Company, Stamford, Conn.

[22] Filed: Feb. 25, 1974

[21] Appl. No.: 445,176

[52] U.S. Cl. ............. 260/210 AB; 195/80; 424/181
[51] Int. Cl.² ......................................... C07H 15/22
[58] Field of Search ...... 260/210 AB, 210 R, 210 K, 260/210 NE

[56] References Cited
UNITED STATES PATENTS

| | | | |
|---|---|---|---|
| 3,792,037 | 2/1974 | Kawaguchi et al. | 260/210 AB |
| 3,833,556 | 9/1974 | Shier et al. | 260/210 AB |

*Primary Examiner*—Johnnie R. Brown
*Attorney, Agent, or Firm*—Edward A. Conroy, Jr.

[57] ABSTRACT

This disclosure describes a new antibiotic, designated BM408α, produced in a microbiological fermentation under controlled conditions using a new strain of the microorganism *Streptomyces canus*.

5 Claims, No Drawings

ANTIBIOTIC BM408α

BRIEF SUMMARY OF THE INVENTION

This invention relates to a new antibiotic designated BM408α and to its production by fermentation, to methods for its recovery and concentration from crude solutions, and to processes for its purification. The novel antibiotic of the present invention may be represented by the following structural formula:

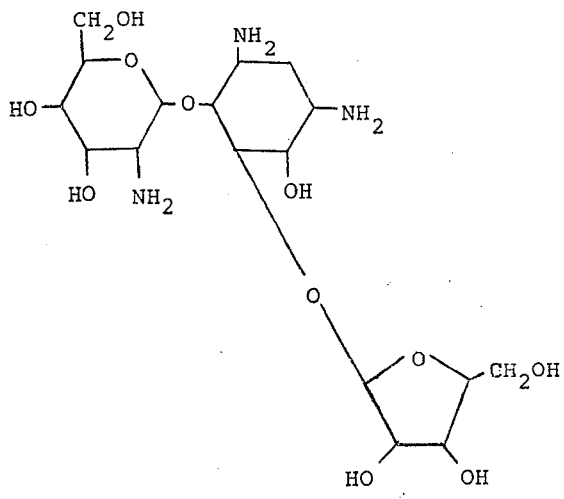

The present invention includes within its scope the antibiotic in dilute form, as a crude concentrate, and in pure crystalline form. The structure of this new antibiotic as well as its effects on specific microorganisms differentiate it from previously described antibacterial agents.

The novel antibiotic of the present invention forms acid-addition salts with a variety of pharmaceutically acceptable organic and inorganic salt-forming reagents. Thus, acid-addition salts, formed by admixture of the antibiotic base with one, two, or three equivalents of an acid, suitably in a neutral solvent, are formed with such acids as sulfuric, phosphoric, hydrochloric, hydrobromic, nitric, citric, lactic, tartaric, acetic, and related acids. For purposes of this invention, the antibiotic free base is equivalent to its non-toxic acid-addition salts.

DETAILED DESCRIPTION OF THE INVENTION

This new antibiotic BM408α is formed during the cultivation under controlled conditions of a new strain of the microorganism *Streptomyces canus*. This new antibiotic producing strain was isolated from a range soil sample collected near Boise, Id. A viable culture of the new microorganism has been deposited with the Culture Collection Laboratory, Northern Utilization Research and Development Division, United States Department of Agriculture, Peoria, Ill., and has been added to its permanent collection. It is freely available to the public in this depository under its accesion number NRRL 5781.

The description and identification of this new microorganism, maintained in the culture collection of the Lederle Laboratories Division, American Cyanamid Company, Pearl River, N.Y. as Culture No. BM408, was supplied by Dr. H.D. Tresner of these laboratories. The following is a general description of the microorganism *Streptomyces canus* NRRL 5781, based on diagnostic characteristics observed. Observations were made of the cultural, physiological and morphological features of the organism in accordance with the methods detailed by Shirling, E. B. and Gottlieb, D., "Methods for Characterization of Streptomyces Species", International Journal of Systematic Bacteriology, 16: 313–340 (1966). The underscored descriptive colors and color chip designations were taken from Jacobson, E., et al., Color Harmony Manual, 3rd edition (1948), Container Corporation of America, Chicago, Illinois.

Amount of Growth

Moderate to heavy on all media used except Bennett's and Czapek's Solution Agars on which only light growth developed.

Aerial Mycelium and Sporulation

Aerial mycelium whitish, becoming Silver Gray (3 fe) to Ashes (5 fe) in sporulating zones on most media.

Soluble Pigments

Yellowish to yellowish-brown or brownish on most media and in light to moderate amounts; absent on Benedict's, Bennet's and Inorganic Salts-Starch Agars.

Reverse Color

Yellowish-brown to brownish shades.

Miscellaneous Physiological Reactions

Complete liquefaction of gelatin in 14 days; nitrates partially reduced to nitrites in 7 days; complete peptonization of purple milk, no curd formation; melaniod pigments not formed on peptone-iron agar; NaCl tolerance in yeast extract agar 7% but < 10%. Carbon source utilization, according to the method of Pridham, T. G. and Gottlieb, D., "The Utilization of Carbon Compounds by Some Actinomycetales as an Aid for Species Determination," Journal of Bacteriology 56: 107–114 (1948) as follows: Good utilization of glycerol, i-inositol, lactose, d-mannitol, d-melibiose, d-raffinose, l-rhamnose, salicin, sucrose, d-trehalose, d-xylose and dextrose; fair utilization of d-fructose; poor utilization of adonitol, l-arabinose and d-melezitose.

Micromorphology

Aerial mycelium gives rise to spore chains in clusters and tangles of tightly wound coils and spirals of a few to many turns. Spores mostly globose to elliptical; $1.0-1.2\mu m \times 0.6-0.8\mu m$; spore surfaces spiny as determined by transmission electron microscopy; spines slender, up to 0.5um in length.

Diagnosis

Culture BM408 is a member of the gray-spored streptomycetes which have, in common, spiralled spore chains, spiny spores and a lack of melanoid pigments. There are approximately two dozen validly described species in this group. Culture BM408 has been compared with published descriptions of these species and, whenever possible, with actual reference specimens. After careful consideration of all members in the group, it was determined that BM408 most closely corresponded to the species *Streptomyces canus*. In the absence of any outstanding diagnostic differences, BM408 will therefore be considered a strain of that species.

It is to be understood that for the production of antibiotic BM408α, the present invention is not limited to this particular microorganism or to microorganisms fully answering the growth and microscopic characteristics which are given for illustrative purposes. In fact, it is desired and intended to include the use of mutants produced from the described microorganism by various means such as exposure to X-radiation, ultraviolet radiation, nitrogen mustard, actinophages, and the like.

The novel antibiotic of the present invention as well as several related antibiotics may be represented by the following general formula:

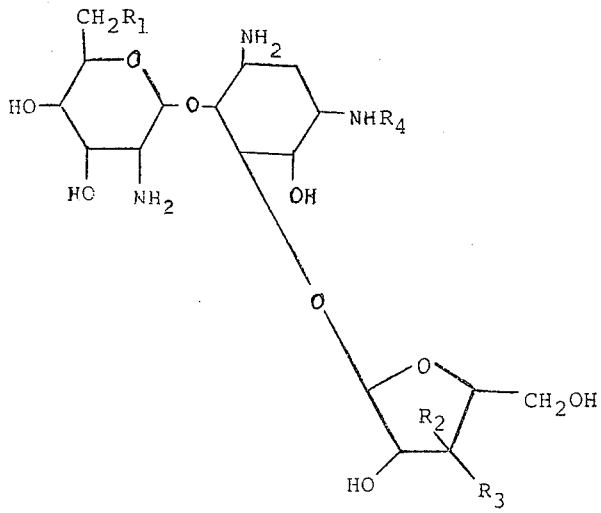

wherein BM408α is represented when $R_1 = OH$; $R_2 = H$; $R_3 = OH$; and $R_4 = H$. Thus BM408α is a structurally related to vistamycin (also called Antibiotic SF733 or ribostamycin), E. Akita, T. Tsuruoka, N. Ezaki and T. Niida, Journal of Antibiotics, 23, 173 (1970), wherein $R_1 = NH_2$; $R_2 = H$; $R_3 = OH$; and $R_4 = H$; an antibiotic currently in clinical study in Japan; and to Bu1709E$_1$ (wherein $R_1 = OH$; $R_2 = OH$; $R_3 = H$; and $R_4 = COCH(OH)CH_2CH_2NH_2$) and BU1709E$_2$ (where $R_1 = OH$; $R_2 = H$; $R_3 = OH$; and $R_4 = COCH(OH)CH_2CH_2NH_2$), H. Tsukiura, K. Saito, S. Kobaru, N. Konishi and H. Kawaguchi, Journal of Antibiotics 26, 386 (1973).

The fermentation of *Streptomyces canus* NRRL 5781 also produces BM408β and a minor component BM408γ which were identified as known antibiotics paromomycin I and paromomycin II, respectively.

BM408α is a white, water soluble powder having $[\alpha]_D^{25°} = +30°(\pm >2°$ or $<10°)$ $(C = 0.0995, H_2O)$. The mass spectral data for BM408α are presented in Table III.

Fermentation Process

Cultivation of *Streptomyces canus* NRRL 5781 may be carried out in a wide variety of liquid culture media. Media which are useful for the production of the novel antibiotic BM408α include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulphate, phosphate, chloride, etc. Trace elements such as boron, molybdenum, copper, etc. are supplied as impurities of other constituents of the media. Aeration in tanks and bottles is provided by forcing sterile air through or onto the surface of the fermenting medium. Further agitation in tanks is provided by a mechanical impeller. An antifoaming agent, such as lard oil, may be added as needed.

Inoculum Preparation

Inoculum of *Streptomyces canus* NRRL 5781 may be prepared by growing the organism in a medium of the following composition:

| | |
|---|---|
| Corn starch | 24 gm./liter |
| Bacto tryptone | 5 gm./liter |
| Yeast extract | 5 gm./liter |
| Beef extract | 3 gm./liter |
| Dextrose | 1 gm./liter |

The pH is adjusted to 7.0 with NaOH.

This inoculum is grown at a temperature of 25°C. to 29°C. and preferably 28°C. with vigorous agitation on a rotary shaker for 30–48 hours. One hundred ml. portions of this inoculum are used to inoculate 1 and 12 liter batches of the same medium in 2 and 20 liter glass fermentors. The inoculum mash is aerated with sterile air while growth is continued for 40–55 hours. These batches of inocula are used to inoculate tank fermentors.

Tank Fermentation

A 3 to 10% portion of the above inoculum is used to seed 300 liters of medium of the following formulation:

| | |
|---|---|
| Dextrose | 15 gm./liter |
| Glycerol | 15 gm./liter |
| Soy flour | 15 gm./liter |
| Calcium carbonate | 1 gm./liter |
| Sodium chloride | 3 gm./liter |
| NaOH — Sufficient to adjust pH to 7.0 | |

Aeration is supplied at the rate of 0.2 to 0.8 liter of sterile air per liter of broth per minute and the mash is agitated by an impeller driven at 200 to 400 r.p.m. The temperature is maintained at 32° to 40°C., usually at 37°C. The fermentation is ordinarily continued for 90 to 120 hours, at which time the mash is harvested.

Isolation and Purification of Antibiotic BM408α

After the fermentation is completed, the fermented mash containing BM408α is filtered. The filtrate is passed through a column of Amberlite XAD-2 (a polystyrene cross-linked with divinyl benzene) resin. The column effluent is then passed through a column of Amberlite IRC-50 (a methacrylic acid-divinyl benzene ion exchange resin) ($NH_4^+$) resin. The resin is washed with water and the antibiotic is eluted with 2N $NH_4OH$. The column eluate (pH 11.7) is evaporated under reduced pressure to about 100 ml. and placed on a column of Dowex 1-X2 (a trimethylbenzylammonium polystyrene cross-linked with 2% divinyl benzene) ($OH^-$) resin which is eluted with water. The antibiotic activity is detected by in vitro assay of a 0.1 ml aliquot of each fraction against *Klebsiella pneumoniae* in the conventional agar diffusion assay. The antibiotic activity is detected in the 255 to 935 ml. fractions of effluent. These fractions are pooled and concentrated on a rotary evaporator to a thick, yellow viscous liquid. The antibiotic is adsorbed onto Dowex 50 W-X8 (a sulfonated polystyrene cross-linked with 8% divinyl benzene) ($H^+$) resin. The column is rinsed with water and the activity is eluted with 1.5 N NH₄OH in 475–814 ml. of eluate. A concentrate of the ammonium hydroxide eluates is chromatographed on a Dowex 1-X2 (OH⁻) column. The column is eluted with water yielding three major fractions. Fraction 1 is adsorbed on a column of Amberlite CG-50 (a methacrylic acid-divinyl benzene ion exchange resin) (NH₄⁺). The resin is eluted with water, 0.1N NH₄OH and finally 0.3N NH₄OH using a stepwise development. Two bioactive eluates are obtained, BM408α (170–220 ml.) and a mixture of BM408β and γ (265–315 ml.). The BM408α eluate is taken to a small volume on a rotary evaporator, freeze dried and the product, BM408α, is recovered as a fine white powder.

In vitro Activity

Antibiotic BM408α is active in vitro against a variety of gram-positive and gram-negative bacteria when tested by the standard agar well diffusion assay procedure. The results of such a test appear in Table I and are reported in terms of the zone of inhibition.

Table I

| Name of Organism | Zone of Inhibition mm.* |
| --- | --- |
| Bacillus cereus (Waksman) | 5.0 |
| Klebsiella pneumoniae (Friedlander's) | 5.3 |
| Alcaligenes sp (ATCC 10153) | 6.2 |
| Bacillus subtilis (Stansly R-78) | 10.9 |
| Bacillus subtilis (pH 6.0 agar) | 8.0 |
| Bacillus subtilis (Stansly R-76) | 8.0 |
| Mycobacterium smegmatis (Stansly R-99) | 20.9 |
| Mycobacterium smegmatis (pH 6.0) | 13.2 |
| Staphylococcus aureus (No. 208) | 5.1 |
| Escherichia coli (Parke Davis) | 6.9 |
| Escherichia coli (resistant to Chloramphenicol) | 8.7 |
| Streptococcus pyogenes (NY 5) | 0 |
| Staphylococcus aureus (209 P) | 9.2 |
| Corynebacterium xerosis (NRRL B-1397) | 9.9 |
| Salmonella gallinarum (No. 605) | 8.2 |
| Salmonella gallinarum (pH 6.0) | 0 |
| Staphylococcus aureus (Smith) | 8.9 |
| Klebsiella pneumoniae (AD) | 2.9 |
| Candida albicans (CA 300) | 0 |
| Pseudomonas aeruginosa (ATCC 10145) | 0 |
| Escherichia coli (311) | 5.2 |
| Aerobacter aerogenes (75) | 5.0 |
| Proteus mirabilis | 4.3 |
| Staphylococcus aureus (ATCC 14154) | 3.4 |
| Escherichia coli (311 DY) | 6.2 |
| Cryptococcus neoformans (SP) | 0 |

*Distance from edge of well to outer edge of inhibition zone

In vivo Activity

The antibiotic BM408α is active in vivo against *Proteus mirabilis*. This new antibacterial is thereby potentially useful as a therapeutic agent in treating bacterial infections in mammals. This new antibacterial can be expected to be usefully employed for treating or controlling bacteria infections by parenteral administration. The usefulness of this new antibacterial agent is demonstrated by its ability to control systemic lethal infections of *Proteus mirabilis* 4671 in mice when administered by a single 0.5 ml. subcutaneous dose suspended in 0.2% aqueous agar to groups of Carworth Farms CF-1 female mice weighing 18–22 gms., which have been infected intraperitoneally with a lethal dose consisting of 0.5 ml. of a 10⁻¹·⁶ trypticase soy broth dilution of a 5 hours trypticase soy broth culture of *Proteus mirabilis* 4671. Table II illustrates the results.

Table II

| Single Subcutaneous Dose (mg./kg.) | Alive/Total Mice Tested 7 Days After Injection |
| --- | --- |
| 128 | 2/2 |
| 64 | 1/2 |
| 32 | 0/2 |
| Infected non-treated controls | 1/20 |

The invention will be described in detail in conjunction with the following specific examples.

EXAMPLE 1

Inoculum Preparation

A typical sterile medium used to grow the primary inoculum was prepared according to the following formula:

| | |
| --- | --- |
| Corn starch | 24 gm./liter |
| Bacto tryptone | 5 gm./liter |
| Yeast extract | 5 gm./liter |
| Beef extract | 3 gm./liter |
| Dextrose | 1 gm./liter |
| pH adjusted to 7.0 with NaOH | |

The washed or scraped spores from an agar slant of culture *Streptomyces canus* NRRL 5781 were used to inoculate each of two 500 ml. flasks each containing 100 ml. of the above sterile medium, which had been adjusted to pH 7.0. The flasks were placed on a rotary shaker and agitated vigorously for 48 hours at 28°C. The resulting flask inoculum was transfered to a 5 gallon glass fermentor containing 12 liters of the same sterile medium. The inoculum mash was aerated with sterile air while growth was carried out for about 48 hours at 28°C., after which the contents were used to seed a 300 liter tank fermentor.

EXAMPLE 2

Fermentation

A fermentation medium was prepared according to the following formula:

| | |
| --- | --- |
| Dextrose | 15 gm./liter |
| Glycerol | 15 gm./liter |
| Soy flour | 15 gm./liter |
| Calcium carbonate | 1 gm./liter |
| Sodium chloride | 3 gm./liter |
| The pH is adjusted to 7.0 with NaOH | |

Twelve liters of inoculum, prepared as described in Example 1, were used to seed 300 liters of the above sterilized fermentation medium. The fermentation was carried out for 114 hours at a temperature of 37°C. with an aeration rate of 0.5 liter of air per liter of mash per minute and an agitation speed of 250 r.p.m. The mash was harvested.

EXAMPLE 3

Isolation and Purification of BM408α

The 300 liter portion of harvested mash from Example 2 was filtered and the resulting filtrate, at pH 8.0, was passed through a 3 liter bed volume or 10.16 cm. by 37 cm. column of Amberlite XAD-2 resin. The column effluent was then passed through a 5 liter bed volume or 10.16 cm. by 61.7 cm. column of Amberlite IRC-50 (NH₄⁺) resin. A monitor for antibiotic activity against *Klebsiella pneumoniae* by the agar diffusion assay was set at 4 hour intervals. The IRC-50 resin was washed with 15 liters of water and the antibiotic was eluted with 30 liters of 2N NH₄OH. The column eluate, consisting of 30 liters at pH 11.7, was evaporated under reduced pressure to 100 ml. This 100 ml. was passed through a 3 × 52 cm. column of Dowex 1-X2 (OH⁻) (50-100 mesh) resin. The column was eluted with water and the antibiotic activity was detected by in vitro assay of 0.1 ml., aliquots of each fraction against *Klebsiella pneumoniae*. Antibiotic activity was detected in the 255 ml. to 935 ml. fractions of column effluent and these fractions were pooled and concentrated on a rotary evaporator to 22 ml. of thick, yellow viscous liquid. The antibiotic in the concentrate was adsorbed onto a column of Dowex 50 W-X8 (H⁺) resin, the column was washed with water and the activity eluted with 1.5N NH₄OH in 475-814 ml. of column eluate. A 10 ml. concentrate of the ammonia eluate was chromatographed on a 1.5 × 20 cm. Dowex 1-X2 (OH⁻) (200-400 mesh) column. The column was eluted with water and three major fractions (40-70, 80-90, and 100-210 ml. of column effluent) were recovered, with solids totaling 868.3 mg.

A 550 mg. portion of the above material (first fraction) was adsorbed on an Amberlite CG-50 (NH₄⁺) (100-200 mesh) (1.5 × 20 cm.) column. The column was eluted, in order, with 300 ml. portions of water, 0.1N NH₄OH and 0.3N NH₄OH using a stepwise development. Two bioactive eluates were obtained, BM408α at 170-220 ml. and a mixture of BM408β and γ at 265-315 ml. The BM408α eluate was reduced to a small volume on a rotary evaporator, freeze-dried and the solid was recovered as a fine white powder. Yield 157.0 mg. $[\alpha]_D^{25°} = +30°$ ($\pm 2°$ or $< 10°$) (C = 0.0995, H₂O)

Table III

Relative Abundance and Composition of Selected Ions in the Mass Spectrum of the N-Acetyl-O-trimethylsilyl Derivative of BM408α

| Relative Abundance | Observed Mass | Calculated Mass | Composition |
|---|---|---|---|
| 100 | 420.2047 | 420.2058 | $C_{17}H_{38}NO_5Si_3$ |
| 28 | 619.2868 | 619.2902* | $C_{26}H_{51}N_2O_9Si_3$ |

Table III-continued

Relative Abundance and Composition of Selected Ions in the Mass Spectrum of the N-Acetyl-O-trimethylsilyl Derivative of BM408α

| Relative Abundance | Observed Mass | Calculated Mass | Composition |
|---|---|---|---|
| 22 | 649.3177 | 649.3192 | $C_{27}H_{57}N_2O_8Si_4$ |
| 100 | 737.3284 | 737.3352* | $C_{30}H_{61}N_2O_{11}Si_4$ |
| 57 | 767.3602 | 767.3642 | $C_{31}H_{67}N_2O_{10}Si_5$ |
| 28 | 808.3710 | 808.3723* | $C_{33}H_{66}N_3O_{12}Si_4$ |
| 72 | 838.3986 | 838.4013 | $C_{34}H_{72}N_3O_{11}Si_5$ |
| 22 | 1040.4664 | 1040.4670* | $C_{42}H_{86}N_3O_{15}Si_6$ |
| 14 | 1070.4948 | 1070.4958 | $C_{43}H_{92}N_3O_{14}Si_7$ |

*Ions resulting from inadvertant O-acetylation of the hydroxyl group of the deoxystreptamine moiety.

We claim:
1. A compound selected from the group consisting of the compound of the formula:

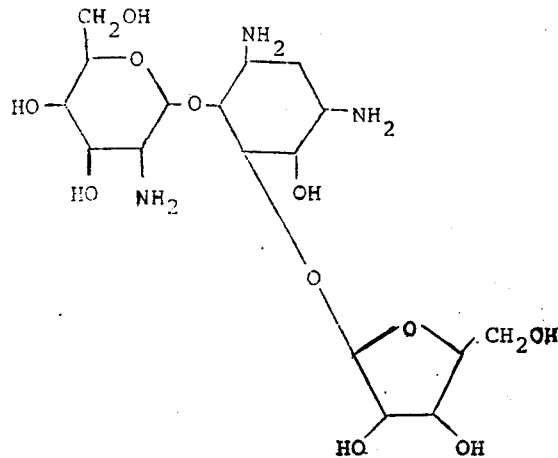

and the pharmacologically acceptable acid-additon salts thereof.
2. The antibiotic free base according to claim 1.
3. The antibiotic monohydrochloride according to claim 1.
4. The antibiotic dihydrochloride according to claim 1.
5. The antibiotic trihydrochloride according to claim 1.

* * * * *